(12) United States Patent
Hoerold et al.

(10) Patent No.: US 12,234,345 B2
(45) Date of Patent: Feb. 25, 2025

(54) FLAME RETARDANT-STABILIZER COMBINATION FOR THERMOPLASTIC POLYMERS

(71) Applicant: CLARIANT INTERNATIONAL LTD, Muttenz (CH)

(72) Inventors: Sebastian Hoerold, Diedorf (DE); Harald Bauer, Kerpen (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 18/010,031

(22) PCT Filed: Jun. 11, 2021

(86) PCT No.: PCT/EP2021/065802
§ 371 (c)(1),
(2) Date: Dec. 13, 2022

(87) PCT Pub. No.: WO2021/254907
PCT Pub. Date: Dec. 23, 2021

(65) Prior Publication Data
US 2023/0227629 A1    Jul. 20, 2023

(30) Foreign Application Priority Data

Jun. 15, 2020  (EP) .................................. 20179990

(51) Int. Cl.
| | | |
|---|---|---|
| *C08K 5/5313* | (2006.01) | |
| *C08K 3/22* | (2006.01) | |
| *C08K 3/38* | (2006.01) | |
| *C08K 5/3492* | (2006.01) | |
| *C08K 5/52* | (2006.01) | |
| *C08K 13/02* | (2006.01) | |
| *C09K 21/12* | (2006.01) | |

(52) U.S. Cl.
CPC .............. *C08K 5/5313* (2013.01); *C08K 3/22* (2013.01); *C08K 3/38* (2013.01); *C08K 5/34924* (2013.01); *C08K 5/34928* (2013.01); *C08K 5/52* (2013.01); *C08K 13/02* (2013.01); *C09K 21/12* (2013.01); *C08K 2003/2227* (2013.01); *C08K 2003/387* (2013.01)

(58) Field of Classification Search
CPC .......... C08K 5/5313; C08K 3/22; C08K 3/38; C08K 5/34924; C08K 5/34928; C08K 5/52; C08K 13/02; C09K 21/12
See application file for complete search history.

(56) References Cited

U.S. PATENT DOCUMENTS

| | | |
|---|---|---|
| 3,900,444 A | 8/1975 | Racky et al. |
| 4,036,811 A | 7/1977 | Noetzel et al. |
| 5,773,556 A | 6/1998 | Kleiner et al. |
| 7,420,007 B2 | 9/2008 | Bauer et al. |
| 2006/0074157 A1 | 4/2006 | Bauer |
| 2013/0190432 A1* | 7/2013 | Krause ..................... C08K 3/22 524/133 |

(Continued)

FOREIGN PATENT DOCUMENTS

| | | |
|---|---|---|
| CN | 1660857 B | 8/2010 |
| CN | 104479350 | 4/2015 |

(Continued)

OTHER PUBLICATIONS

Translation of Office Action dated Feb. 22, 2023, issued in corresponding Taiwan Patent Application No. 110121203.
International Search Report and Written Opinion dated Aug. 19, 2021, issued in corresponding International Patent Application No. PCT/EP2021/065802.
International Preliminary Report on Patentability dated May 10, 2022, issued in corresponding International Patent Application No. PCT/EP2021/065802.

*Primary Examiner* — John E Uselding

(57) ABSTRACT

The invention provides a flame retardant-stabilizer combination for thermoplastic polymers, comprising as component A 20% to 99.7% by weight of phosphinic salt of the formula (I), (I), in which $R_1$ and $R_2$ are each ethyl, M is Al and m is 3; as component B 0.2% to 16% by weight of aluminium salts of ethylbutylphosphinic acid, of dibutylphosphinic acid, of ethylhexylphosphinic acid, of butylhexylphosphinic acid and/or of dihexylphosphinic acid; as component C 0.1% to 80% by weight of a salt of phosphorous acid having the general formula (II) $[HP(=O)O_2]^{2-}M^{m+}$ (II) in which M is Zn and m is 2; as component D 0% to 80% by weight of a salt of phosphorous acid having the general formula (III) $[HP(=O)O_2]^{2-}{}_3 M^{m+}{}_2$ (III) in which M is Al and m is 3; as component E 0% to 30% by weight of a nitrogen-containing synergist and/or of a phosphorus-containing and/or nitrogen-containing flame retardant; as component F 0% to 10% by weight of an inorganic synergist selected from zinc borate, zinc stannate, boehmite and/or hydrotalcite; as component G 0% to 3% by weight of an organic phosphonite and/or a mixture of an organic phosphonite and an organic phosphite and as component H 0% to 3% by weight of an ester and/or salt of long-chain aliphatic carboxylic acids (fatty acids) typically having chain lengths of $C_{14}$ to $C_{40}$, where the sum total of the components is always 100% by weight.

(I)

$$\left[ \begin{array}{c} R_1 \\ R_2 \end{array} \!\!\!\! \begin{array}{c} O \\ \| \\ P-O \end{array} \right]_m^- M^{m+}$$

18 Claims, No Drawings

(56) References Cited

U.S. PATENT DOCUMENTS

| | | |
|---|---|---|
| 2014/0371361 A1 | 12/2014 | Bauer |
| 2019/0153197 A1 | 5/2019 | Krause et al. |
| 2020/0172730 A1 | 6/2020 | Bauer et al. |
| 2021/0147676 A1 | 5/2021 | Bauer et al. |
| 2021/0363348 A1 | 11/2021 | Bauer et al. |

FOREIGN PATENT DOCUMENTS

| | | | | |
|---|---|---|---|---|
| CN | 109251523 | | 1/2019 | |
| CN | 109385079 | | 2/2019 | |
| CN | 109467747 A | | 3/2019 | |
| DE | 2252258 A1 | | 5/1974 | |
| DE | 2447727 A1 | | 4/1976 | |
| DE | 19607635 A1 | | 9/1997 | |
| DE | 19920276 A1 | | 11/2000 | |
| DE | 102004050555 A1 | | 4/2006 | |
| DE | 102004051246 A1 | | 5/2006 | |
| DE | 20101048025 A1 | | 4/2012 | |
| DE | 102014018586 A1 | | 6/2016 | |
| DE | 102017212096 A1 | | 1/2019 | |
| DE | 102017215780 A1 | | 3/2019 | |
| EP | 1544206 A1 | | 6/2005 | |
| IN | 2020017009276 A | * | 4/2020 | ............... C08K 3/32 |
| TW | 201920408 A | | 6/2019 | |
| WO | 2019/011789 A1 | | 1/2019 | |
| WO | 2019/030251 A1 | | 2/2019 | |
| WO | 2019048313 A1 | | 3/2019 | |

\* cited by examiner

FLAME RETARDANT-STABILIZER COMBINATION FOR THERMOPLASTIC POLYMERS

The invention relates to a flame retardant-stabilizer combination for halogen-free thermoplastic polymers and to polymeric moulding compounds and mouldings comprising such flame retardant-stabilizer combinations.

Combustible plastics generally have to be equipped with flame retardants in order to be able to attain the high flame retardancy demands made by the plastics processors and in some cases by the legislator. Preferably—for environmental reasons as well—nonhalogenated flame retardant systems that form only small amounts of smoke gases, if any, are used.

Among these flame retardants, the salts of alkylphosphinic acids (phosphinates) have been found to be particularly effective for thermoplastic polymers (DE-2252258A and DE-2447727A). But the gas phase activity thereof and the alkyl radicals bonded to the phosphorus atom in the molecule generally lead to enhanced smoke formation.

U.S. Pat. No. 7,420,007B2 and DE-A-102017212096 disclose that dialkyl phosphinates containing a small amount of selected telomers are suitable as flame retardants for polymers. However, the person skilled in the art will expect these telomers to have enhanced smoke formation owing to their alkyl radicals.

It is known that aluminium diethylphosphinate and melamine polyphosphate and aluminium oxides in epoxy resins have low smoke formation. However, epoxy resins can be rendered flame-retardant relatively easily; significantly smaller amounts of flame retardant are required than in the present polyamides and polyesters that are more difficult to render flame-retardant. Consequently, it is particularly surprising that the present flame retardant-stabilizer combination achieves excellent values in polyamides and polyesters.

The problem addressed to date by mixtures of a dialkylphosphinic salt and an aluminium phosphite or mixtures of a dialkylphosphinic salt and a zinc phosphite and/or a phosphorus/nitrogen flame retardant (DE-A-20101048025), aside from flame retardancy, has been merely that of improving the stability of plastics on processing in the melt, bringing about good mechanical properties (better elongation at break) and not leading to mould deposits or to exudation from the plastics.

Systems composed of aluminium diethylphosphinate and melamine polyphosphate and aluminium hydroxides in ethylene-vinyl acetate copolymers require very high amounts of flame retardant that have an adverse effect on the stability of the polymers.

While the use of flame retardants in polymer resins can considerably reduce inflammability, this can lead to high evolution of smoke when the polymer resins are exposed to heat or flames. Such evolution of smoke should be avoided since it can lead to major damage and also to poisoning resulting in death.

It is therefore an object of the present invention to provide a flame retardant-stabilizer combination and polymeric moulding compounds and mouldings containing such flame retardant-stabilizer combinations which in principle show both zero or very low combustibility and zero or very low smoke formation when the polymeric moulding compounds and mouldings etc. are exposed to heat or flames.

This object is achieved by a flame retardant-stabilizer combination comprising as component A 20% to 99% by weight of phosphinic salt of the formula (I)

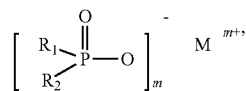

in which
R$_1$ and R$_2$ are each ethyl, M is Al and
m is 3;
as component B 0.2% to 16% by weight of aluminium salts of ethylbutylphosphinic acid, of dibutylphosphinic acid, of ethylhexylphosphinic acid, of butylhexylphosphinic acid and/or of dihexylphosphinic acid;
as component C 1% to 80% by weight of a salt of phosphorous acid having the general formula (II)

$$[HP(=O)O_2]^{2-}M^{m+} \quad (II)$$

in which
M is Zn and
m is 2;
as component D 0% to 80% by weight of a salt of phosphorous acid having the general formula (III)

$$[HP(=O)O_2]^{2-}{}_3 M^{m+}{}_2 \quad (III)$$

in which
M is Al and
m is 3;
as component E 0% to 30% by weight of a nitrogen-containing synergist and/or of a phosphorus-containing and/or nitrogen-containing flame retardant; as component F 0% to 10% by weight of an inorganic synergist selected from zinc borate, zinc stannate, boehmite and/or hydrotalcite;
as component G 0% to 3% by weight of an organic phosphonite and/or a mixture of an organic phosphonite and an organic phosphite and
as component H 0% to 3% by weight of an ester and/or salt of long-chain aliphatic carboxylic acids (fatty acids) typically having chain lengths of C$_{14}$ to C$_{40}$, where the sum total of the components is always 100% by weight.

The inventive flame retardant-stabilizer combination preferably comprises
  20% to 97.8% by weight of component A,
  0.2% to 16% by weight of component B,
  1% to 80% by weight of component C and
  1% to 80% by weight of component D,
where the sum total of the components is always 100% by weight.

The inventive flame retardant-stabilizer combination more preferably comprises
  20% to 97.6% by weight of component A,
  0.2% to 16% by weight of component B,
  1% to 50% by weight of component C,
  1% to 50% by weight of component D,
  0% to 30% by weight of component E,
  0% to 10% by weight of component F,
  0.1% to 2% by weight of component G and
  0.1% to 2% by weight of component H,
where the sum total of the components is always 100% by weight.

In a particular embodiment, the inventive flame retardant-stabilizer combination comprises
  20% to 97.6% by weight of component A,
  0.2% to 16% by weight of component B,
  1% to 30% by weight of component C, 0% to 80% by weight of component D,
1% to 10% by weight of component E,
0% to 10% by weight of component F,
0.1% to 2% by weight of component G and
0.1% to 2% by weight of component H,
where the sum total of the components is always 100% by weight.

In a further embodiment, the inventive flame retardant-stabilizer combination comprises
20% to 96.6% by weight of component A,
0.2% to 16% by weight of component B,
1% to 50% by weight of component C,
1% to 50% by weight of component D,
1% to 10% by weight of component E,
0% to 10% by weight of component F,
0.1% to 2% by weight of component G and
0.1% to 2% by weight of component H,
where the sum total of the components is always 100% by weight.

In yet a further embodiment, the inventive flame retardant-stabilizer combination comprises
20% to 96.6% by weight of component A,
0.2% to 16% by weight of component B,
1% to 50% by weight of component C,
1% to 50% by weight of component D,
0% to 10% by weight of component E,
1% to 10% by weight of component F,
0.1% to 2% by weight of component G and
0.1% to 2% by weight of component H,
where the sum total of the components is always 100% by weight.

Component B preferably comprises the Al salts of ethylbutylphosphinic acid, of dibutylphosphinic acid and/or of ethylhexylphosphinic acid.

Component C is preferably zinc phosphite, secondary zinc phosphite ($ZnHPO_3$), $Zn(H_2PO_3)_2$, $Zn_{2/3}HPO_3$, zinc phosphite hydrates, zinc pyrophosphite ($ZnH_2P_2O_5$), basic zinc phosphite of the formula

$Zn_{1+x}HPO_3(OH)_{2x}$ with x=0 to 0.25
and/or sodium zinc phosphites of the formula

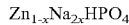
$Zn_{1-x}Na_{2x}HPO_4$ with x=0.001 to 0.5.

Component D preferably comprises aluminium phosphite [$Al(H_2PO_3)_3$], secondary aluminium phosphite [$Al_2(HPO_3)_3$], basic aluminium phosphite [$Al(OH)(H_2PO_3)_2 \cdot 2aq$], aluminium phosphite tetrahydrate [$Al_2(HPO_3)_3 \cdot 4aq$], aluminium phosphonate, $Al_7(HPO_3)_9(OH)_6(1,6\text{-hexanediamine})_{1.5} \cdot 12H_2O$, $Al_2(HPO_3)_3 \cdot xAl_2O_3 \cdot nH_2O$ where x=2.27–1 and/or $Al_4H_6P_{16}O_{18}$, and aluminium phosphites of the formulae (IV), (V) and/or (VI)

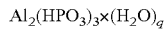
$Al_2(HPO_3)_3 \times (H_2O)_q$ (IV)

in which
q is 0 to 4,

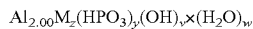
$Al_{2.00}M_z(HPO_3)_y(OH)_v \times (H_2O)_w$ (V)

in which
M represents alkali metal ions
z is 0.01 to 1.5
y is 2.63 to 3.5
v is 0 to 2, and
w is 0 to 4,

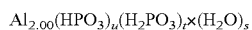
$Al_{2.00}(HPO_3)_u(H_2PO_3)_t \times (H_2O)_s$ (VI)

in which
u is 2 to 2.99,
t is 2 to 0.01, and
s is 0 to 4,
and/or comprises mixtures of aluminium phosphite of the formula (IV) with sparingly soluble aluminium salts and nitrogen-free extraneous ions, mixtures of aluminium phosphite of the formula (VI) with aluminium salts, aluminium phosphite [$Al(H_2PO_3)_3$], secondary aluminium phosphite [$Al_2(HPO_3)_3$], basic aluminium phosphite [$Al(OH)(H_2PO_3)_2 \cdot 2aq$], aluminium phosphite tetrahydrate [$Al_2(HPO_3)_3 \cdot 4aq$], aluminium phosphonate, $Al_7(HPO_3)_9(OH)_6(1,6\text{-hexanediamine})_{1.5} \cdot 12H_2O$, $Al_2(HPO_3)_3 \cdot xAl_2O_3 \cdot nH_2O$ with x=2.27-1 and/or $Al_4H_6P_{16}O_{18}$.

Component E preferably comprises condensation products of melamine and/or reaction products of melamine with polyphosphoric acid and/or reaction products of condensation products of melamine with polyphosphoric acid or mixtures thereof; and/or melamine cyanurate.

Component E is more preferably melem, melam, melon, dimelamine pyrophosphate, melamine polyphosphate, melem polyphosphate, melam polyphosphate, melon polyphosphate, and/or mixed polysalts thereof and/or nitrogen-containing phosphates of the formulae $(NH_4)_yH_{3-y}PO_4$ or $(NH_4PO_3)_z$ where y is 1 to 3 and z is 1 to 10 000.

The invention also relates to the use of a flame retardant-stabilizer combination according to one or more of Claims 1 to 11 as flame retardant in or as flame retardant for clearcoats and intumescent coatings, in or as flame retardant for wood and other cellulosic products, in or as reactive and/or nonreactive flame retardant for polymers, for production of flame-retardant polymer moulding compounds, for production of flame-retardant polymer mouldings and/or for rendering polyester and pure and blended cellulose fabrics flame-retardant by impregnation, and/or as synergist and/or as synergist in further flame retardant mixtures.

The invention likewise relates to flame-retardant thermoplastic or thermoset polymer moulding compounds or polymer mouldings, films, filaments and/or fibres comprising 2% to 50% by weight of flame retardant-stabilizer combination according to one or more of Claims 1 to 11, 50% to 98% by weight of thermoplastic or thermoset polymer or mixtures thereof, 0% to 50% by weight of additives and 0% to 60% by weight of filler or reinforcing materials, where the sum of the components is 100% by weight.

The flame-retardant thermoplastic or thermoset polymer moulding compounds or polymer mouldings, films, filaments and/or fibres preferably comprise 7% to 30% by weight of flame retardant-stabilizer combination according to one or more of Claims 1 to 11, 30% to 91% by weight of thermoplastic or thermoset polymer or mixtures thereof, 1% to 30% by weight of additives and 1% to 40% by weight of filler or reinforcing materials, where the sum of the components is 100% by weight.

The thermoplastic polymer preferably comprises HI (high-impact) polystyrene, polyphenylene ethers, polyamides, polyesters or polycarbonates, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type.

The additives are preferably antioxidants, UV absorbers, light stabilizers, metal deactivators, peroxide-destroying compounds, polyamide stabilizers, basic costabilizers, nucleating agents, further flame retardants and/or other additions.

The fillers and reinforcers are preferably calcium carbonate, silicates, glass fibres, asbestos, talc, kaolin, mica, barium sulfate, metal oxides and hydroxides, carbon black, graphite and/or other suitable substances.

The invention finally also relates to the use of the inventive flame-retardant thermoplastic or thermoset polymer moulding compound or polymer mouldings, films, filaments and/or fibres in or for plug connectors, current-bearing components in power distributors (residual current protection), circuit boards, potting compounds, power connectors, circuit breakers, lamp housings, LED lamp housings, capacitor housings, coil elements, ventilators, grounding contacts, plugs, in/on printed circuit boards, housings for plugs, cables, flexible circuit boards, charging cables, motor covers, textile coatings and other products.

The suitable components C preferably include the following zinc salts of phosphorous acid (also called zinc phosphites here) with CAS numbers 14332-59-3, 114332-59-3, 1431544-62-5, 14902-88-6, 52385-12-3 and 51728-08-6.

The zinc phosphites preferably have particle sizes of 0.1 to 100 μm and more preferably of 0.1 to 30 μm.

Preferably suitable components D are aluminium phosphites having CAS numbers 15099-32-8, 119103-85-4, 220689-59-8, 56287-23-1, 156024-71-4 and 71449-76-8.

Preferably suitable components D are also mixtures of aluminium phosphite and aluminium hydroxide having a composition of 5-95% by weight of $Al_2(HPO_3)_3 \cdot nH_2O$ and 95-5% by weight of $Al(OH)_3$, more preferably 10-90% by weight of $Al_2(HPO_3)_3 \cdot nH_2O$ and 90-10% by weight of $Al(OH)_3$, most preferably 35-65% by weight of $Al_2(HPO_3)_3 \cdot nH_2O$ and 65-35% by weight of $Al(OH)_3$, and in each case n=0 to 4.

The aforementioned aluminium phosphites preferably have particle sizes of 0.2 to 100 μm.

Preferred aluminium salts of phosphorous acid (component D) are also water-insoluble or sparingly water-soluble salts thereof.

Components E used are preferably melamine polyphosphate (referred to as MPP), Melapur® 200 (from Ciba SC, Switzerland), melamine cyanurate (referred to as MC), Melapur® MC50 (from Ciba SC, Switzerland), melem, Delacal® 420, Delacal® 360 (from Delamin Ltd, UK) and other products.

Component E preferably also comprises ammonium hydrogenphosphate, ammonium dihydrogenphosphate and/or ammonium polyphosphate.

Suitable components E are also compounds of the formulae (VII) to (XII) or mixtures thereof

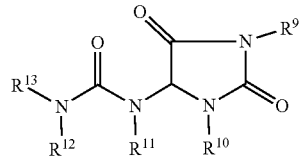
(VII)

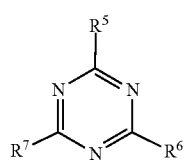
(VIII)

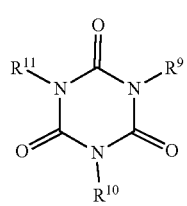
(IX)

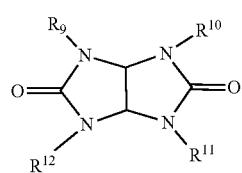
(X)

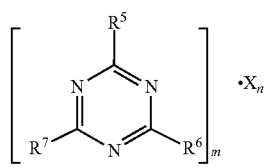
(XI)

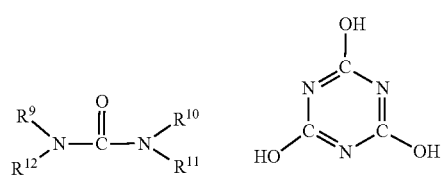
(XII)

in which
$R^5$ to $R^7$ are hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$ and —$N(R^8)R^9$, and N-alicyclic or N-aromatic,
$R^8$ is hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy or $C_6$-$C_{12}$-aryl or -arylalkyl,
$R^9$ to $R^{13}$ are the same groups as $R^8$, and also —O—$R^8$,
m and n are each independently 1, 2, 3 or 4,
X denotes acids which can form adducts with triazine compounds (VII); or oligomeric esters of tris(hydroxyethyl) isocyanurate with aromatic polycarboxylic acids.

Particularly suitable components E are benzoguanamine, tris(hydroxyethyl) isocyanurate, allantoin, glycoluril, melamine, melamine cyanurate, dicyandiamide and/or guanidine.

Suitable components G are, for instance, mixtures of Irgafos® 168/Irganox® 1098 1:1 for nylon-6,6 and Ultranox® 626/Irganox® 1076 1:1 for PBT.

A suitable component H is, for instance, Licomont® CaV 102 from Clariant Produkte (Deutschland) GmbH (a Ca salt of montan wax acid).

Examples of suitable antioxidants are alkylated monophenols, for example 2,6-di-tert-butyl-4-methylphenol; 1 2-alkylthiomethylphenols, for example 2,4-dioctylthiomethyl-6-tert-butylphenol; hydroquinones and alkylated hydroquinones, for example 2,6-di-tert-butyl-4-methoxyphenol; tocopherols, for example α-tocopherol, β-tocopherol, γ-tocopherol, δ-tocopherol, and mixtures thereof (vitamin E); hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide; alkylidenebisphenols, for example 2,2'-methylenebis(6-tert-butyl-4-methylphenol); O-, N- and S-benzyl compounds, e.g. 3,5,3',5'-tetra-tert-butyl-4,4'-dihydroxydibenzyl ether; hydroxybenzylated malonates, e.g. dioctadecyl 2,2-bis(3,5-di-tert-butyl-2-hydroxybenzyl)malonate; hydroxybenzyl aromatics, e.g. 1,3,5-tris(3,5-di-tert-butyl)-4-hydroxybenzyl)-2,4,6-trimethylbenzene, 1,4-bis(3, 5-di-tert-butyl-4-hydroxybenzyl)-2,3,5,6-tetramethylbenzene, 2,4,6-tris(3,5-di-tert-butyl-4-hydroxybenzyl)phenol; triazine compounds, e.g. 2,4-bisoctylmercapto-6-(3,5-di-tert-butyl-4-hydroxyanilino)-1, 3,5-triazine; benzyl phosphonates, e.g. dimethyl 2,5-di-tert-butyl-4-hydroxybenzylphosphonate; acylaminophenols, 4-hydroxylauramide, 4-hydroxystearanilide, N-(3,5-di-tert-butyl-4-hydroxyphenyl)carbamic acid octyl ester; esters of β-(3,5-di-tert-butyl-4-hydroxyphenyl)propionic acid with mono- or polyhydric alcohols; esters of β-(5-tert-butyl-4-hydroxy-3-methylphenyl)propionic acid with mono- or polyhydric alcohols; esters of β-(3,5-dicyclohexyl-4-hydroxyphenyl)propionic acid with mono- or polyhydric alcohols; esters of 3,5-di-tert-butyl-4-hydroxyphenylacetic acid with mono- or polyhydric alcohols; amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3, 5-di-tert-butyl-4-hydroxyphenylpropionyl)hydrazine.

Examples of suitable UV absorbers and light stabilizers are 2-(2'-hydroxyphenyl)benzotriazoles, for example 2-(2'-hydroxy-5'-methylphenyl)-benzotriazole; 2-hydroxybenzophenones, for example the 4-hydroxy, 4-methoxy, 4-octoxy, 4-decyloxy, 4-dodecyloxy, 4-benzyloxy, 4,2',4'-trihydroxy, 2'-hydroxy-4,4'-dimethoxy derivative; esters of optionally substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate; acrylates, for example ethyl or isooctyl α-cyano-β,β-diphenylacrylate, methyl α-carbomethoxycinnamate, methyl or butyl α-cyano-β-methyl-p-methoxycinnamate, methyl α-carbomethoxy-p-methoxycinnamate, N-(β-carbomethoxy-β-cyanovinyl)-2-methylindoline.

Examples of suitable polyamide stabilizers are copper salts in combination with iodides and/or phosphorus compounds, and salts of divalent manganese.

Suitable basic costabilizers are melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony catecholate or tin catecholate.

Examples of suitable nucleating agents are 4-tert-butylbenzoic acid, adipic acid, and diphenylacetic acid.

Examples of fillers and reinforcers include calcium carbonate, silicates, glass fibres, asbestos, talc, kaolin, mica, barium sulfate, metal oxides and hydroxides, carbon black, graphite, and others.

Suitable further flame retardants are, for example, aryl phosphates, organic phosphonates, salts of hypophosphorous acid and red phosphorus.

Examples of other added substances include plasticizers, expandable graphite, lubricants, emulsifiers, pigments, optical brighteners, flame retardants, antistats, blowing agents.

The polymer more preferably comprises polyamides and/or polyesters.

The polymer more preferably comprises polyamides, polyesters and PPE/HIPS blends.

The abovementioned additives may be introduced into the polymer in a wide variety of different process steps. For instance, it is possible in the case of polyamides or polyesters, at the start or at the end of the polymerization/polycondensation or in a subsequent compounding operation, to mix the additives into the polymer melt. In addition, there are processing operations in which the additives are not added until a later stage. This is practised especially when using pigment or additive masterbatches. There is also the possibility of applying additives, particularly in powdered form, to the polymer pellets, which may be warm as a result of the drying operation, by drum application.

The flame retardant-stabilizer combination is preferably in the form of pellets, flakes, fine grains, powder and/or micronizate.

The flame retardant-stabilizer combination is preferably in the form of a physical mixture of the solids, of a melt mixture, of a compactate, of an extrudate, or in the form of a masterbatch.

The flame retardant-stabilizer combination preferably has an average particle size of 0.1-200 μm, more preferably of 1-50 μm.

Suitable polyesters derive from dicarboxylic acids and esters thereof and diols and/or from hydroxycarboxylic acids or the corresponding lactones. Particular preference is given to using terephthalic acid and ethylene glycol, propane-1,3-diol and butane-1,3-diol.

Suitable polyesters include polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The flame-retardant polyester moulding compounds produced in accordance with the invention are preferably used in polyester mouldings.

Preferred polyester mouldings are filaments, fibres, films and mouldings which comprise mainly terephthalic acid as the dicarboxylic acid component and mainly ethylene glycol as the diol component.

Preferably, the resulting phosphorus content in filaments and fibres produced from flame-retardant polyesters is 0.1% to 18%, preferably 0.5% to 15%, and, in the case of films, 0.2% to 15%, preferably 0.9% to 12% by weight.

Suitable polystyrenes are polystyrene, poly(p-methylstyrene) and/or poly(alpha-methylstyrene).

The suitable polystyrenes are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; high impact resistance mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The suitable polystyrenes are preferably also graft copolymers of styrene or alpha-methylstyrene, for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkylacrylates or polyalkylmethacrylates, styrene and acrylonitrile onto acrylate-butadiene copolymers, and mixtures thereof, as known, for example, as what are called ABS, MBS, ASA or AES polymers.

The polymers are preferably polyamides and copolyamides which derive from diamines and dicarboxylic acids and/or from aminocarboxylic acids or the corresponding lactams, such as nylon-2,12, nylon-4, nylon-4,6, nylon-6, nylon-6,6, nylon-6,9, nylon-6,10, nylon-6,12, nylon-6,66, nylon-7,7, nylon-8,8, nylon-9,9, nylon-10,9, nylon-10,10, nylon-11, nylon-12, etc. These are known, for example, by the trade names Nylon®, from DuPont, Ultramid®, from BASF, Akulon® K122, from DSM, Zytel® 7301, from DuPont; Durethan® B 29, from Bayer and Grillamid®, from Ems Chemie.

Also suitable are aromatic polyamides proceeding from m-xylene, diamine and adipic acid; polyamides prepared from hexamethylenediamine and iso- and/or terephthalic acid and optionally an elastomer as a modifier, for example poly-2,4,4-trimethylhexamethyleneterephthalamide or poly-m-phenyleneisophthalamide, block copolymers of the aforementioned polyamides with polyolefins, olefin copolymers, ionomers or chemically bound or grafted elastomers, or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

The invention finally also relates to a process for producing flame-retardant polymer mouldings, characterized in that inventive flame-retardant polymer moulding compounds are processed by injection moulding (for example injection-moulding machine of the Aarburg Allrounder type) and pressing, foam injection moulding, internal gas-pressure injection moulding, blow moulding, film casting, calendering, laminating or coating at elevated temperatures to give the flame-retardant polymer moulding.

The polymers are preferably thermoplastic elastomers.

Thermoplastic elastomers (abbreviation: TPE) are materials which are thermoplastically processible and have rubber-like use properties.

Thermoplastic elastomers can be shaped very easily, since they pass through the plastic state in the course of processing. They can be produced in all hardnesses from 5 Shore A to more than 70 Shore D.

Thermoplastic elastomers have, in partial ranges, physical crosslinking points which break down with heating, without decomposition of the macromolecules.

Therefore, they have much better processibility than normal elastomers. Thus, the polymer wastes can also be melted again and processed further. According to internal structure, a distinction is made between block copolymers and elastomer alloys.

Block copolymers have hard and soft segments within one molecule. The polymer thus consists of one type of molecule in which both properties are distributed.

Elastomer alloys are polyblends, i.e. mixtures (blends) of finished polymers, i.e. the polymer consists of two or more molecule types. Through different mixing ratios and additives, tailored materials are obtained (for example polyolefin elastomer formed from polypropylene (PP) and natural rubber (NR)—according to the mixing ratio, they cover a wide hardness range).

A distinction is made between the following groups:
TPE-O or TPO=olefin-based thermoplastic elastomers, predominantly PP/EPDM, e.g. Santoprene® (AES/Monsanto)
TPE-V or TPV=crosslinked olefin-based thermoplastic elastomers, predominantly PP/EPDM, e.g. Sarlink® (DSM)
TPE-U or TPU=urethane-based thermoplastic elastomers, e.g. Desmopan® (Bayer)
TPE-E or TPC=thermoplastic copolyesters, e.g. Hytrel® (DuPont)
TPE-S or TPS=styrene block copolymers (SBS, SEBS, SEPS, SEEPS and MBS), e.g. Septon® (Kuraray) or Thermolast® (Kraiburg TPE)
TPE-A or TPA=thermoplastic copolyamides, e.g. PEBAX® (Arkema)

Particularly preferred thermoplastic elastomers are thermoplastic copolyesters, thermoplastic copolyamides and thermoplastic polyurethanes.

Copolyether esters that are suitable for the compositions according to the invention are polymers that are prepared by reacting a $C_2$-$C_6$ diol with an aromatic diacid unit and a poly(alkylene oxide) diol.

Particularly preferred copolyether esters are selected from:
1. copolyether esters of butylenediol, terephthalate and PTMEG;
2. copolyether esters of butylenediol, mixture of terephthalate and isophthalate, and PTMEG;
3. copolyether esters of butylenediol, terephthalate and poly(propylene oxide) diol;
4. copolyether esters of propylenediol, terephthalate and PTMEG; and
5. copolyether esters of propylenediol, terephthalate and poly(propylene oxide) diol.

Particular preference is given to a copolyether ester of butylenediol, terephthalate and PTMEG.

Preference is given to using the flame retardant-stabilizer combination in a moulding compound of a polyamide or of a polyester. Suitable polyamides are described, for example, in DE-A-19 920 276.

The polyamides are preferably those of the amino acid type and/or of the diamine-dicarboxylic acid type.

Preferred polyamides are nylon-6 and/or nylon-6,6.

The polyamides are preferably unmodified, coloured, filled, unfilled, reinforced, unreinforced, or otherwise modified.

The polyesters are preferably polyethylene terephthalate or polybutylene terephthalate.

The polyesters are preferably unmodified, coloured, filled, unfilled, reinforced, unreinforced, or otherwise modified.

Preparation of Zinc Phosphite

EXAMPLE 1

To an initial charge of 8763.6 g of zinc sulfate heptahydrate and 736.2 g of demineralized water was added 5235.8 g of disodium phosphite solution (39.3%) within 2 h, and then 370 g of demineralized water. The resultant zinc phosphite was crystallized at 150° C. for 5 h. Subsequently, the slurry was discharged and filtered three times in a suction filter with five times the mass of demineralized water, and the filter cake was dried at 130° C. in a drying cabinet. This results in 2096 g of product (97% yield). The x-ray powder diffractogram shows reflections at angles of 2 theta 18.2°/d value 4.86 ångström, and 20.5°/4.33 Å, 23.8°/3.75 Å, 30.3°/2.95 Å, 31.0°/2.88 Å, 32.5°/2.76 Å, 33.0°/2.72 Å.

EXAMPLE 2

The same chemical doses are used as in Example 1. The zinc phosphite was crystallized at 150° C. for 0.5 h and washed and dried as in Example 1. This results in 2090 g of product (97% yield). The x-ray powder diffractogram shows the same reflections as in Example 1.

EXAMPLE 3

The same chemical doses are used as in Example 1. The zinc phosphite was crystallized at 115° C. for 5 h and washed and dried as in Example 1. This results in 2098 g of product of composition $Na_2Zn_3(HPO_3)_4$ (97% yield).

The x-ray powder diffractogram shows reflections at angles of 2 theta 10.0°/d value 8.82 ångström, and 0.0°/4.67 Å, 20.15°/4.41 Å, 21.3°/4.17 Å, 22.8°/3.89 Å, 27.8°/3.21 Å, 28.1°/3.17 Å.

EXAMPLE 4

The same chemical doses are used as in Example 1. The zinc phosphite was crystallized at 100° C. for 1 h and washed and dried as in Example 1. This results in 2095 g of product of composition $ZnHPO_3 * 1.5H_2O$ (97% yield).

The x-ray powder diffractogram shows reflections at angles of 2 theta 12.1°/d value 7.33 ångström, and 19.3°/4.60 Å, 22.8°/3.89 Å, 23.6°/3.77 Å.

Examples with Polymers

1. Components Used

Commercial Polymers (Pellets):
- Nylon-6,6 (PA 6,6-GR): Ultramid® A27 (from BASF AG, Germany)
- Nylon-6T/6,6: Zytel® HTN FE 8200 (from DuPont, USA) polybutylene terephthalate (PBT): Ultradur® B4500 (from BASF AG, Germany)
- PPG HP 3610 EC 10 4.5 mm glass fibres (from Nippon Electric Glass, the Netherlands)
- PPG HP 3786 EC 10 4.5 mm glass fibres (from Nippon Electric Glass, the Netherlands)

Flame Retardant (Component A):
- aluminium diethylphosphinate, aluminium salt of diethylphosphinic acid prepared in analogy to example 1 of DE 196 07 635 A1.

Flame Retardant (Component B1):
- aluminium salt of diethylphosphinic acid containing
  - 1.7 mol % of aluminium ethylbutylphosphinate (examples B7, B11, B15, B16, B18, B20, B22, B23, B25, B27, B28, B29) or
  - 1.3 mol % (B5, B13, B21, B26)
  - 5.3 mol % (B12)
  - 7.3 mol % (B6, B17)
  - 0.7 mol % (B8, B10, B14, B19, B24)
- prepared by the process according to U.S. Pat. No. 7,420,007 B2

Flame Retardant (Component B2):
- aluminium salt of diethylphosphinic acid containing
  - 0.7 mol % of aluminium dibutylphosphinate (B9)
  - 1.7 mol % of aluminium dibutylphosphinate (B22)
- prepared by the process according to U.S. Pat. No. 7,420,007 B2

Flame Retardant (Component B3):
- aluminium salt of diethylphosphinic acid containing
  - 1.7 mol % of aluminium ethylhexylphosphinate (B23)
- prepared by the process according to U.S. Pat. No. 7,420,007 B2

Flame Retardant (Component C):
- zinc salt of phosphorous acid, referred to hereinafter as PHOPZN Flame Retardant (Component D):
- aluminium salt of phosphorous acid, referred to hereinafter as PHOPAL Synergist (Component E):
- melamine polyphosphate (referred to as MPP), Melapur® 200 (from Ciba SC, Switzerland)
- melamine cyanurate (referred to as MC), Melapur® MC50 (from Ciba SC, Switzerland)
- melem, Delacal® 420, Delacal® 360 (from Delamin Ltd, UK)

Component F:
- zinc borate, Firebrake® ZB and Firebrake® 500, from Borax, USA Boehmite: Apyral AOH 180, from Nabaltec, Germany Stabilizers (Component G):
- Irgafos 168/Irganox 1098 1:1 for nylon-6,6, Ultranox 626/Irganox 1076 1:1 for PBT; PEP-Q Wax Components (Component H):
- Licomont® CaV 102, Clariant Produkte (Deutschland) GmbH, Germany (Ca salt of montan wax acid)
- Licowax® E, from Clariant Produkte (Deutschland) GmbH, Germany (esters of montan wax acid)

2. Production, Processing, and Testing of Flame-Retardant Polymer Moulding Compounds The flame retardant components were mixed with the phosphonite, lubricants, and stabilizers in the ratio specified in the table and incorporated via the side intake of a twin-screw extruder (Leistritz ZSE 27/44D) into PA 6,6 at temperatures of 260 to 310° C., and into PBT at 250-275° C. The glass fibres were added via a second side intake. The homogenized polymer strand was drawn off, cooled in a water bath, and then pelletized.

After sufficient drying, the moulding compounds were processed into test specimens on an injection-moulding machine (Arburg 320 C Allrounder) at melt temperatures of 250 to 300° C., and tested and classified for flame retardancy using the UL 94 test (Underwriter Laboratories).

The UL 94 fire classifications are as follows:

V-0 afterflame time never longer than 10 sec, total of afterflame times for 10 flame applications not more than 50 sec, no flaming drops, no complete consumption of the specimen, afterglow time for specimens never longer than 30 sec after end of flame application.

V-1 afterflame time never longer than 30 sec after end of flame application, total of afterflame times for 10 flame applications not more than 250 sec, afterglow time for specimens never longer than 60 sec after end of flame application, other criteria as for V-0.

V-2 cotton indicator ignited by flaming drops, other criteria as for V-1.

Not classifiable (ncl): Does not conform to fire classification V-2.

D Smoke Density

Optical smoke gas density was determined according to standard ISO 5659 in an NBS smoke chamber from Fire Testing Technologies, UK. Specimens produced by injection moulding with dimensions of 75 mm×75 mm and a thickness of 2 mm. The specimens were clamped horizontally and irradiated with 25 kW/m$^2$ in the presence of a pilot flame for 40 min. The attenuation of a light beam by the smoke is measured with a photodetector. Smoke gas density is inversely proportional to the attenuation of light.

The flowability of the moulding compounds was determined by establishing the melt volume flow rate (MVR) at 275° C./2.16 kg. A sharp rise in the MVR value indicates polymer degradation.

For comparability, all tests in the respective series, unless stated otherwise, were performed under identical conditions (temperature programs, screw geometries, injection moulding parameters, etc.).

The amounts stated in the tables which follow are parts by weight.

Table 1 shows how the addition of zinc phosphite and aluminium phosphite reduces the smoke gas density of nylon-6,6 with aluminium diethylphosphinate, aluminium butylethylphosphinate and aluminium dibutylphosphinate. PHOPZN results in a lower smoke gas density. Only the use of aluminium diethylphosphinate, aluminium butylethylphosphinate and aluminium dibutylphosphinate, PHOPZN and PHOPAL together achieves the UL 94 V-0 fire class together with a low smoke gas density.

Table 2 shows comparative examples V4 and V5 in which a flame retardant-stabilizer combination based on aluminium diethylphosphinate and aluminium butylethylphosphinate, MPP, PHOPZN or PHOPAL was used.

The results in which the flame retardant-stabilizer mixture according to the invention was used are listed in examples B12 to B15. All amounts are reported as % by weight and are based on the polymer moulding compound including the flame retardant-stabilizer combination and additives.

TABLE 2

PA 6,6 GF 30 test results. V2 to V4 are comparative examples; B12 to B15 are flame retardant-stabilizer mixture according to the invention

|  | V2 | V4 | B12 | B13 | B14 | B15 |
|---|---|---|---|---|---|---|
| Nylon-6,6 | 49.55 | 49.55 | 49.55 | 49.55 | 49.55 | 49.55 |
| 3610 glass fibres | 30 | 30 | 30 | 30 | 30 | 30 |
| A: aluminium diethylphosphinate | 13 | 15 | 15 | 14.81 | 13.4 | 14.75 |
| B1: aluminium butylethylphosphinate |  |  | 0.75 | 0.19 | 0.1 | 0.25 |
| C: PHOPZN |  |  | 2 | 2.5 | 2.5 | 1 |
| D: PHOPAL |  | 2 |  | 2.5 | 2 | 3 |
| E: MPP | 7 | 3 | 3 |  | 2 | 1 |
| H: Licowax E | 0.25 | 0.25 | 0.25 | 0.25 | 0.25 | 0.25 |
| G: 168/1098 1:1 | 0.20 | 0.20 | 0.20 | 0.20 | 0.20 | 0.20 |
| UL 94 0.8 mm | V-0 | V-0 | V-1 | V-0 | V-0 | V-0 |
| MVR 275° C./2.16 kg | 19 | 13 | 12 | 5 | 9 | 7 |
| Opt. smoke gas density | high | high | average | low | low | low |

It is apparent from examples B12-15 that the mixture according to the invention of the aluminium diethylphosphinate and aluminium butylethylphosphinate, PHOPZN, PHOPAL and optionally MPP components achieves the UL 94 V-0 fire class, low MVR (little polymer degradation) and low optical smoke gas density.

TABLE 1

PA 6,6 GF 30 test results. V1-V2 are comparative examples; B5 to B11 are flame retardant-stabilizer mixtures according to the invention

|  | V1 | V2 | B5 | B6 | B7 | B8 | B9 | B10 | B11 |
|---|---|---|---|---|---|---|---|---|---|
| Nylon-6,6 | 50 | 50 | 50 | 50 | 50 | 50 | 50 | 50 | 50 |
| 3610 glass fibres | 30 | 30 | 30 | 30 | 30 | 30 | 30 | 30 | 30 |
| A: aluminium diethylphosphinate | 20 | 17.5 | 17.27 | 15.15 | 15.98 | 16.15 | 14.9 | 14.9 | 12.29 |
| B1: aluminium butylethylphosphinate |  |  | 0.23 | 1.1 | 0.27 | 0.11 |  | 0.1 | 0.21 |
| B2: aluminium dibutylphosphinate |  |  |  |  |  |  | 0.1 |  |  |
| C: PHOPZN |  |  | 2.5 | 2.5 | 2.5 | 2.5 | 2.5 | 2.5 | 5 |
| D: PHOPAL |  | 2.5 |  | 1.25 | 1.25 | 1.25 | 2.5 | 2.5 | 2.5 |
| UL 94 0.8 mm | V-1 | V-0 | V-1 | V-0 | V-0 | V-0 | V-0 | V-0 | V-0 |
| Opt. smoke gas density | high | high | average | low | low | low | low | low | low |

TABLE 3

PBT GF 25 test results. V5-V6 are comparative examples; B16-B25 are flame retardant-stabilizer mixture according to the invention

| | V5 | V6 | B16 | B17 | B18 | B19 | B20 | B21 | B22 | B23 | B24 | B25 |
|---|---|---|---|---|---|---|---|---|---|---|---|---|
| PBT | 54.55 | 54.55 | 54.55 | 54.55 | 54.55 | 54.55 | 54.55 | 54.55 | 54.55 | 54.55 | 54.55 | 54.55 |
| 3786 glass fibres | 25 | 25 | 25 | 25 | 25 | 25 | 25 | 25 | 25 | 25 | 25 | 25 |
| A: aluminium diethylphosphinate | 13 | 12 | 11.8 | 13.98 | 11.8 | 11.92 | 18.69 | 15.2 | 11.8 | 11.8 | 15.3 | 9.83 |
| B1: aluminium butylethylphosphinate | | | 0.2 | 1.02 | 0.2 | 0.08 | 0.31 | 0.2 | | | 0.1 | 0.17 |
| B2: aluminium dibutylphosphinate | | | | | | | | | 0.2 | | | |
| B3: aluminium ethylhexylphosphinate | | | | | | | | | | 0.2 | | |
| C: PHOPZN | | | 5 | 2.5 | 2 | 2 | 0.5 | 0.3 | 2 | 2 | 0.3 | 9 |
| D: PHOPAL | | 5 | | 2.5 | 2 | 2 | 0.5 | 0.3 | 2 | 2 | 0.3 | |
| E1: MC | 7 | 3 | 3 | | | 4 | | | | | 4 | 1 |
| E2: MPP | | | | | 4 | | | 4 | 4 | 4 | | |
| H: Licowax E | 0.25 | 0.25 | 0.25 | 0.25 | 0.25 | 0.25 | 0.25 | 0.25 | 0.25 | 0.25 | 0.25 | 0.25 |
| G: P-EPQ | 0.2 | 0.2 | 0.2 | 0.2 | 0.2 | 0.2 | 0.2 | 0.2 | 0.2 | 0.2 | 0.2 | 0.2 |
| UL 94 0.8 mm | V-1 | V-0 | V-0 | V-0 | V-0 | V-0 | V-0 | V-0 | V-0 | V-0 | V-0 | V-1 |
| Solution viscosity SV* | 1185 | 1235 | 1279 | 1375 | 1350 | 1238 | 1320 | 1290 | 1255 | 1370 | 1335 | 1235 |
| Opt. smoke gas density | high | high | average | low | low | low | average | average | low | low | average | low |

*in dichloroacetic acid, pure PBT (uncompounded) gives 1450

The incorporation of aluminium diethylphosphinate and MC results in a high smoke gas density and only a UL 94 V-1 fire class. The combination of aluminium diethylphosphinate, PHOPAL and MC leads to UL 94 V-0 and high smoke gas density. Only by the inventive incorporation of aluminium diethylphosphinate, aluminium butylethylphosphinate, aluminium dibutylphosphinate, aluminium ethylhexylphosphinate, PHOPZN or PHOPAL and PHOPZN, and MC or MPP, achieves a V-1N-0 fire class and reduced smoke gas density.

The inventive combination of aluminium diethylphosphinate, aluminium butylethylphosphinate, aluminium dibutylphosphinate, aluminium ethylhexylphosphinate with PHOPZN and PHOPAL and optionally the further additives additionally virtually completely suppresses polymer degradation, as discernible from the low SV number.

TABLE 4

PA6T/6,6 GF 30 test results. V7-V8 are comparative examples; B26-B29 are flame retardant-stabilizer mixture according to the invention

| | V7 | V8 | B26 | B27 | B28 | B29 |
|---|---|---|---|---|---|---|
| Nylon-6T/6,6 | 54.55 | 54.55 | 54.55 | 54.55 | 54.55 | 54.55 |
| 3610 glass fibres | 30 | 30 | 30 | 30 | 30 | 30 |
| A: aluminium diethylphosphinate | 15 | 13 | 13 | 12 | 12 | 12 |
| B1: aluminium butylethylphosphinate | | | 0.2 | 0.2 | 0.2 | 0.2 |
| C: PHOPZN | | | 2 | 2.5 | 1.5 | 1 |
| D: PHOPAL | | 2 | | 2.5 | 1.5 | 1 |
| F: boehmite | | | | | 2 | 3 |
| H: CaV 102 | 0.25 | 0.25 | 0.25 | 0.25 | 0.25 | 0.25 |
| G: P-EPQ | 0.20 | 0.20 | 0.20 | 0.20 | 0.20 | 0.20 |
| UL 94 0.8 mm | V-0 | V-1 | V-1 | V-0 | V-0 | V-0 |
| Opt. smoke gas density | high | high | average | low | low | low |

Table 4 shows that the inventive combination of aluminium diethylphosphinate, aluminium butylethylphosphinate, PHOPZN and PHOPAL achieves a V-1N-0 classification with reduced smoke gas density than without PHOPZN or the combination of PHOPZN and PHOPAL.

The invention claimed is:

1. A flame retardant-stabilizer combination for thermoplastic polymers, comprising
as component A 20% to 97.6% by weight of phosphinic salt of the formula (I)

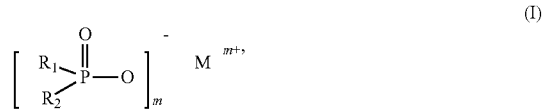

(I)

in which
R₁ and R₂ are each ethyl, M is Al and
m is 3;
as component B 0.2% to 16% by weight of aluminium salts of ethylbutylphosphinic acid, of dibutylphosphinic acid, of ethylhexylphosphinic acid, of butylhexylphosphinic acid and/or of dihexylphosphinic acid;
as component C 1% to 50% by weight of a salt of phosphorous acid having the general formula (II)

$$[HP(=O)O_2]^{2-}M^{m+}$$ (II)

in which
M is Zn and
m is 2;
as component D 1% to 50% by weight of a salt of phosphorous acid having the general formula (III)

$$[HP(=O)O_2]^{2-}{}_3M^{m+}{}_2$$ (III)

in which
M is Al and
m is 3;
as component E 0% to 30% by weight of a nitrogen-containing synergist and/or of a phosphorus-containing and/or nitrogen-containing flame retardant;
as component F 0% to 10% by weight of an inorganic synergist selected from zinc borate, zinc stannate, boehmite and/or hydrotalcite;
as component G 0.1% to 2% by weight of an organic phosphonite and/or a mixture of an organic phosphonite and an organic phosphite; and as component H 0.1% to 2% by weight of an ester and/or salt of long-chain aliphatic carboxylic acids (fatty acids) having chain lengths of $C_{14}$ to $C_{40}$, where the sum total of components A-H is always 100% by weight.

2. The flame retardant-stabilizer combination according to claim 1, comprising:
20% to 96.6% by weight of component A,
0.2% to 16% by weight of component B,
1% to 50% by weight of component C,
1% to 50% by weight of component D,
1% to 10% by weight of component E,
0% to 10% by weight of component F,
0.1% to 2% by weight of component G, and
0.1% to 2% by weight of component H,
where the sum total of components A-H is always 100% by weight.

3. The flame retardant-stabilizer combination according to claim 1, comprising:
20% to 96.6% by weight of component A,
0.2% to 16 by weight of component B,
1% to 50% by weight of component C,
1% to 50% by weight of component D,
0% to 10% by weight of component E,
1% to 10% by weight of component F,
0.1% to 2% by weight of component G, and
0.1% to 2% by weight of component H,
where the sum total of components A-H is always 100% by weight.

4. The flame retardant-stabilizer combination according to claim 1, wherein component B comprises the Al salts of ethylbutylphosphinic acid, of dibutylphosphinic acid and/or of ethylhexylphosphinic acid.

5. The flame retardant-stabilizer combination according to claim 1, wherein component E comprises condensation products of melamine and/or reaction products of melamine with polyphosphoric acid and/or reaction products of condensation products of melamine with polyphosphoric acid or mixtures thereof; and/or melamine cyanurate.

6. The flame retardant-stabilizer combination according to claim 5, wherein component E comprises melem, melam, melon, dimelamine pyrophosphate, melamine polyphosphate, melem polyphosphate, melam polyphosphate, melon polyphosphate, and/or mixed polysalts thereof and/or nitrogen-containing phosphates of the formulae $(NH_4)_y H_{3-y} PO_4$ or $(NH_4 PO_3)_z$, where y is 1 to 3 and z is 1 to 10 000.

7. A flame retardant clearcoat, intumescent coating, wood or other cellulosic product, polymer, polymer moulding, polyester, pure or blended cellulose fabric, or synergist comprising the flame retardant-stabilizer combination according to claim 1.

8. A flame-retardant thermoplastic or thermoset polymer moulding compound or polymer moulding, film, filament, and/or fibre comprising 2% to 50% by weight of the flame retardant-stabilizer combination according to claim 1, 50% to 98% by weight of thermoplastic or thermoset polymer or mixtures thereof, 0% to 50% by weight of additives and 0% to 60% by weight of filler or reinforcing materials, where the sum of the components is 100% by weight.

9. A flame-retardant thermoplastic or thermoset polymer moulding compound or polymer moulding, film, filament, and/or fibre comprising 7% to 30% by weight of the flame retardant-stabilizer combination according to claim 1, 30% to 91% by weight of thermoplastic or thermoset polymer or mixtures thereof, 1% to 30% by weight of additives and 1% to 40% by weight of filler or reinforcing materials, where the sum of the components is 100% by weight.

10. A flame-retardant thermoplastic or thermoset polymer moulding compound or polymer moulding, film, filament, and/or fibre comprising the flame retardant mixture according to claim 1, wherein the polymer comprises thermoplastic polymers of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type.

11. The flame-retardant thermoplastic or thermoset polymer moulding compound or polymer moulding, film, filament, and/or fibre according to claim 8, wherein the additives are antioxidants, UV absorbers, light stabilizers, metal deactivators, peroxide-destroying compounds, polyamide stabilizers, basic costabilizers, nucleating agents, further flame retardants and/or other additions.

12. The flame-retardant thermoplastic or thermoset polymer moulding compound or polymer moulding, film, filament, and/or fibre according to claim 8, wherein the fillers and reinforcers are calcium carbonate, silicates, glass fibres, asbestos, talc, kaolin, mica, barium sulfate, metal oxides and hydroxides, carbon black, graphite and/or other suitable substances.

13. A flame-retardant plug connector, a current-bearing component in a power distributor (residual current protection), a circuit board, a potting compound, a power connector, a circuit breaker, a lamp housing, an LED lamp housing, a capacitor housing, a coil element, a ventilator, a grounding contact, a plug, a printed circuit board, a housing for a plug, a cable, a flexible circuit board, a charging cable, a motor cover, a textile coating, or other product comprising the thermoplastic or thermoset polymer moulding compound or polymer moulding, film, filament, and/or fibre according to claim 8.

14. The flame-retardant thermoplastic or thermoset polymer moulding compound or polymer moulding, film, filament, and/or fibre according to claim 9, wherein the additives are antioxidants, UV absorbers, light stabilizers, metal deactivators, peroxide-destroying compounds, polyamide stabilizers, basic costabilizers, nucleating agents, further flame retardants and/or other additions.

15. The flame-retardant thermoplastic or thermoset polymer moulding compound or polymer moulding, film, filament, and/or fibre according to claim 9, wherein the fillers and reinforcers are calcium carbonate, silicates, glass fibres, asbestos, talc, kaolin, mica, barium sulfate, metal oxides and hydroxides, carbon black, graphite and/or other suitable substances.

16. The flame-retardant thermoplastic or thermoset polymer moulding compound or polymer moulding, film, filament, and/or fibre according to claim 8, wherein the additives are antioxidants, UV absorbers, light stabilizers, metal deactivators, peroxide-destroying compounds, polyamide stabilizers, basic costabilizers, nucleating agents, further flame retardants and/or other additions.

17. The flame-retardant thermoplastic or thermoset polymer moulding compound or polymer moulding, film, filament, and/or fibre according to claim 8, wherein the fillers and reinforcers are calcium carbonate, silicates, glass fibres, asbestos, talc, kaolin, mica, barium sulfate, metal oxides and hydroxides, carbon black, graphite and/or other suitable substances.

18. The flame-retardant thermoplastic or thermoset polymer moulding compound or polymer moulding, film, filament, and/or fibre according to claim 11, wherein the fillers and reinforcers are calcium carbonate, silicates, glass fibres, asbestos, talc, kaolin, mica, barium sulfate, metal oxides and hydroxides, carbon black, graphite and/or other suitable substances.

* * * * *